(12) United States Patent
Clark

(10) Patent No.: US 8,726,789 B2
(45) Date of Patent: May 20, 2014

(54) AIR PUMP OPERATED BREWER SYSTEM AND METHOD

(75) Inventor: Charles H. Clark, Chatham, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 825 days.

(21) Appl. No.: 11/548,676

(22) Filed: Oct. 11, 2006

(65) Prior Publication Data

US 2007/0186780 A1    Aug. 16, 2007

Related U.S. Application Data

(60) Provisional application No. 60/725,824, filed on Oct. 11, 2005.

(51) Int. Cl.
*A47J 31/32* (2006.01)
*A47J 31/24* (2006.01)

(52) U.S. Cl.
USPC ............... 99/302 R; 99/300; 99/283; 426/433

(58) Field of Classification Search
USPC ................. 99/280, 283, 300, 302 R; 426/433
See application file for complete search history.

(56) References Cited

U.S. PATENT DOCUMENTS

| | | | |
|---|---|---|---|
| 3,371,592 A * | 3/1968 | Remy et al. ...................... 99/282 |
| 3,691,933 A | 9/1972 | Martin | |
| 4,143,589 A | 3/1979 | Weber | |
| 4,829,889 A | 5/1989 | Takeuchi et al. | |
| 6,142,063 A * | 11/2000 | Beaulieu et al. ................ 99/283 |
| 6,763,759 B2 | 7/2004 | Denisart | |
| 7,398,726 B2 * | 7/2008 | Streeter et al. .................. 99/305 |
| 2002/0170438 A1 | 11/2002 | Liu | |
| 2006/0196363 A1 * | 9/2006 | Rahn .............................. 99/279 |

FOREIGN PATENT DOCUMENTS

WO    03/092457 A1    11/2003

OTHER PUBLICATIONS

Int'l Search Report & Written Opinion issued in App. No. PCT/US06/40013 (2007).

* cited by examiner

*Primary Examiner* — Reginald L Alexander
(74) *Attorney, Agent, or Firm* — Barnes & Thornburg LLP

(57) ABSTRACT

A system as disclosed herein uses a cold or unheated water source such as a reservoir or a pressurized inlet feed line, and a heated water reservoir. The unheated water reservoir is pressurized with a pressurizing apparatus communicating with the unheated water reservoir. Such a pressurizing apparatus may include an air pump, bladder or piston arrangement as well as other pressurizing apparatus. The pressurizing apparatus is controllable to push water from the unheated water reservoir to the heated water reservoir. As a result of the pressurization and displacement of the unheated water, heated water is then displaced and forced from the heated water reservoir. Heated water from the heated water reservoir is dispensed to the spray head and over the beverage brewing substance such as coffee for brewing.

12 Claims, 3 Drawing Sheets

AIR PUMP OPERATED BREWER SYSTEM AND METHOD

RELATED APPLICATION

This application claims the priority of U.S. Provisional Patent Application No. 60/725,824 filed on Oct. 11, 2005 the complete disclosure of which is hereby expressly incorporated by reference.

BACKGROUND

The present disclosure relates to a brewing system or other system for producing food products and/or beverages which uses a heated water system. The heated water system uses a pressurizing apparatus for dispensing heated water from the heated water system for producing beverage or other food product.

A variety of brewing systems heat water and dispense water to a brewing substance to produce a beverage. One form of brewed beverage dispensing system includes a rapid heating chamber in which unheated water is introduced into the rapid heating chamber whereupon it is rapidly heated and dispensed over ground coffee for producing a brewed beverage. This system is often called a "burp and boil" system. It does not allow flow rate control and has small passage ways prone to line buildup.

Another form of brewing system includes a reservoir for retaining a quantity of heated water which is maintained generally at a heated temperature or within a temperature range for use in brewing on demand. In one embodiment of this "on demand brewing system", water is introduced into a basin which is positioned above the heated water reservoir and communicates with the heated water reservoir. Water flows under force of gravity from the reservoir into the heated water reservoir. Generally, the water is introduced in the bottom of the reservoir where it tends to settle due to temperature differentials between an upper portion and a lower portion of the reservoir. Generally, when water is introduced into the heated water reservoir it displaces a quantity of heated water which is then dispensed through an outlet to a dispensing line onto ground coffee for producing a brewed coffee beverage. The flow of water into and out of the heated water reservoir is controlled by the volume of the water added to the reservoir and gravity or head pressure of the water in the basin.

Some brewing systems known as "siphon system brewers" generally only operate at one flow rate, and provide one volume, that being the volume poured or automatically dispensed into the reservoir. In other words, water is retained in the heated water reservoir with water dispensed into the heated water reservoir displacing water retained in the reservoir. As the volume dispersed displaces water in the reservoir, the amount displaced is generally equal to the volume dispersed. Moreover, the flow rate out of the heated water reservoir is set at a generally fixed flow rate and generally is not controllable or variable.

In "siphon system brewers" the ability to control the water flow may be problematic because the water cannot be pulsed easily or turned on and off during the brewing process. Moreover, due to the operation requirements of a "siphon system brewer" such pulsing or starting and stopping of the water flow may be impossible at lower volumes.

A system which includes a "dump valve" on an outlet line from the reservoir to the brew funnel can be used to pulse or turn the water on and off. This is accomplished by controlling the "dump valve" on and off during the brewing process. However, the use of the valve complicates the control logic for the machine. Additionally, such a brewer requires that a defined amount of head is provided in the reservoir to maintain a constant head pressure across the valve. If the head pressure is constant, then the flow will be constant when the valve is open, so time can be used to achieve brew volume targets. Also, the dimensional and space requirements of the machine generally requires additional height of the machine to maintain the desirable pressures. The head pressure is established at a desirable level so as to provide accuracy in dispensing a predetermined volume during the brewing process.

Additionally, the systems described above have generally smaller water dispensing passage ways or involve control elements (valves). These passage ways are connected to the "heated" side of the brewer such that they dispense heated water from the heated water reservoir. These passage ways can accumulate lime or other material deposits as well as material flakes which otherwise deposit elsewhere in the system. The accumulation of these deposits or particles in the smaller passageways can reduce the flow rate from the desired levels as originally designed for operation of the system and can negatively influence the resulting product. With regard to beverages, such as coffee, the reduced flow rate can negatively influence flavor characteristics of the coffee and provide incorrect brew volume.

The system as disclosed herein uses a cold or unheated water source such as a reservoir or a pressurized inlet feed line, and a heated water reservoir. The unheated water reservoir is pressurized with a pressurizing apparatus communicating with the unheated water reservoir. Such a pressurizing apparatus may include an air pump, bladder or piston arrangement as well as other pressurizing apparatus. The pressurizing apparatus is controllable to push water from the unheated water reservoir to the heated water reservoir. As a result of the pressurization and displacement of the unheated water, heated water is then displaced and forced from the heated water reservoir. Heated water from the heated water reservoir is dispensed to the spray head and over the beverage brewing substance such as coffee for brewing.

In one embodiment, unheated water is introduced in a bottom portion of the heated water reservoir. The outlet line connected to the spray head communicates with an upper portion of the heated water reservoir to allow heated water to exit near the top of the heated water reservoir. This configuration takes advantage of the stratification of different temperature water within the same reservoir to optimize the water temperature being dispensed from the heated water reservoir to the spray head. The pressurizing apparatus may include an air pump which at least in one embodiment is driven by a DC motor. Use of a DC motor allows for control of the dispensing of water from the heated water reservoir. Controlled operation of the DC motor allows for different volumetric flow rates to be dispensed from the heated water reservoir. As a result, the beverage may be brewed at different rates. Also, this embodiment can produce a pulsing of water from the heated water reservoir to the beverage brewing substance. Controlled pulsing can be used to control the contact time during which the beverage brewing substance is in contact with the water to adjust the flavor profile of the finished beverage. The DC motor or other operation of the pressurized system such as the air pump can be controllably programmed to produce a desired recipe.

In this embodiment, the absence of control valves and other devices between the heated water reservoir and the spray head reduces the sites for accumulation or accretion of lime or other minerals in this portion of brewing system. As such, cleaning devices such as brushes, springs or flexible shafts can be extended from the spray head port through the dispense line to the heated reservoir thereby helping to further reduce lime or other mineral deposits which may accumulate and to allow for removal or cleaning of these deposits from the dispense line.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

Figure 1:
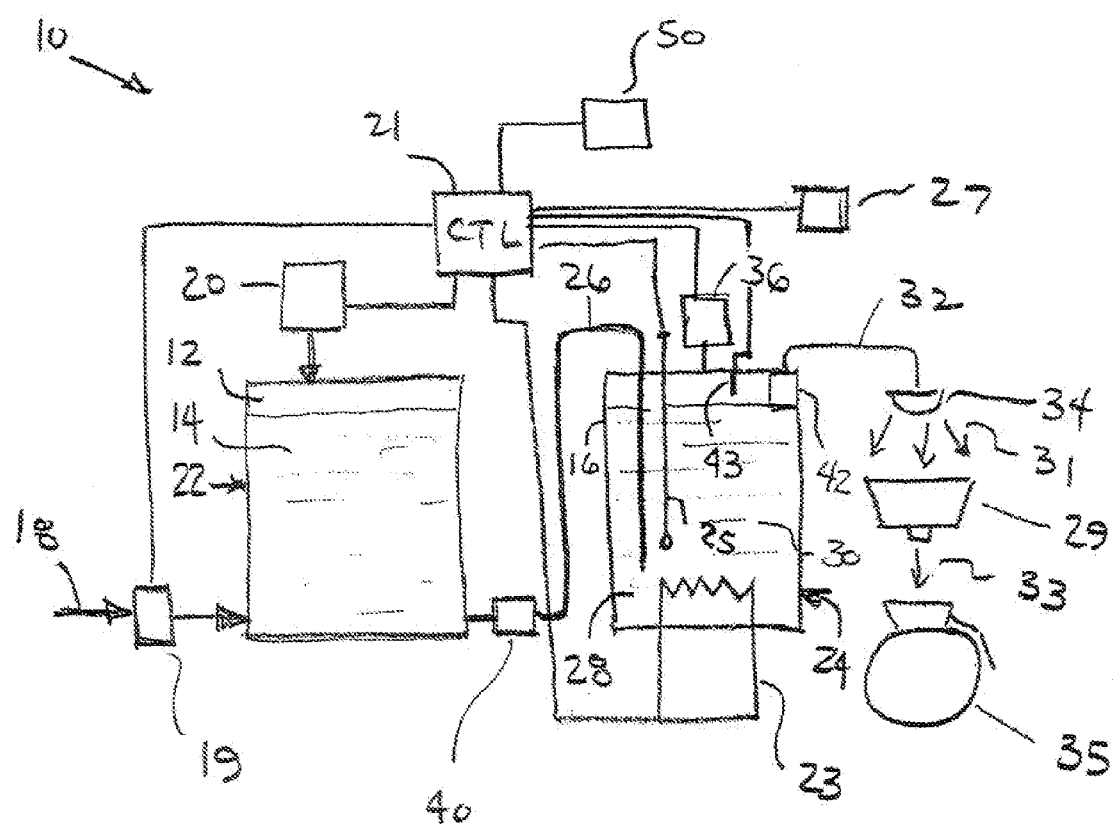
FIG. 1 is a diagrammatic illustration of an embodiment of the disclosed system and apparatus and is used to describe the method of the disclosure.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

FIG. 1 provides a general diagramatic illustration relating to the present disclosure. This illustration is intended for use with a heated water system and more particularly may be used with a heated water system which is used for producing a brewed beverage. It should be understood that the present disclosure is not limited to the system, but is intended to be broadly interpreted to include all applications such as described in detail herein and which might be developed based on the disclosure provided herein.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The terms heated water may be interpreted as hot water, and generally refers to adding energy to water to heat the water above ambient temperature. The term heated is used to distinguish from the term unheated such that unheated water is generally introduced into the reservoir during the brewing cycle.

Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is intended to include, without limitation, at least funnel and filter-type, packet or pouch-type, pod-type or other prepackaged or unpackaged forms of retaining and making a beverage or making of a food product.

While the disclosure shows an illustration of a brewer as described above, it is intended and understood that the term brewer is to be broadly interpreted to include brewers of any configuration including that as shown as well as, by way of example but not limitation, single cup or pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

With regard to FIG. 1, a brewing system 10 includes a pressurizing system in the form of an air pump 20, which when activated controllably pressurizes an unheated water reservoir 22. Unheated water 12 may be introduced by a user through an opening 300 (see FIG. 300), or automatically through an inlet valve 19. Either way, a seal is provided on the unheated water reservoir 22 to facilitate pressurization by pump 20. Once air 12 above unheated water 14 is pressurized, unheated water 14 flows out of the unheated water reservoir 22 and into the heated water reservoir 24 through inlet line or passageway 26. The passageway 26 extends a bottom portion 28 of the reservoir 24. In order to maintain temperature stratification to help optimize the temperature of the water dispensed, the passageway 26 delivers water in the lower portion 28 of the reservoir 24. The water 30 in the heated water reservoir 24 is displaced upwardly towards an upper portion 16 of the reservoir 24 and moves through the dispense or outlet line 32 and exits a spray head 34. A vent or check valve 36 may be provided on the heated water reservoir 24 to allow air to enter the reservoir 24 when the pressurizing apparatus 20 is stopped.

This configuration facilitates pulse brewing, and more precise control over volume of water dispensed. If the variation in the type of pressurizing apparatus is too significant, a flow meter 40 may be provided in the passageway 26 to control and add precision to the volume of water delivered. While a flow meter 40 is shown in the figures this component is not required in all configurations and may be eliminated where it may not be necessary. A siphon hub 42 is provided on the entrance to the dispense line 32 to allow for a small portion of water to continue to be dispensed after the pressurizing apparatus 20 is stopped. Water continues to flow as a result of a siphon action though the siphon hub 42. This action leaves room for any expansion of water due to heating which may otherwise exit the spray head.

A venting valve 41 may be present in the line 26. It would close a vent path during brew cycle, but open to vent when water flow is interrupted by turning off pump 20. This provides more precision in volume control and allows expansion water from hot tank 24 to flow into the unheated reservoir 22 rather than exit the spray head.

Figure 2:
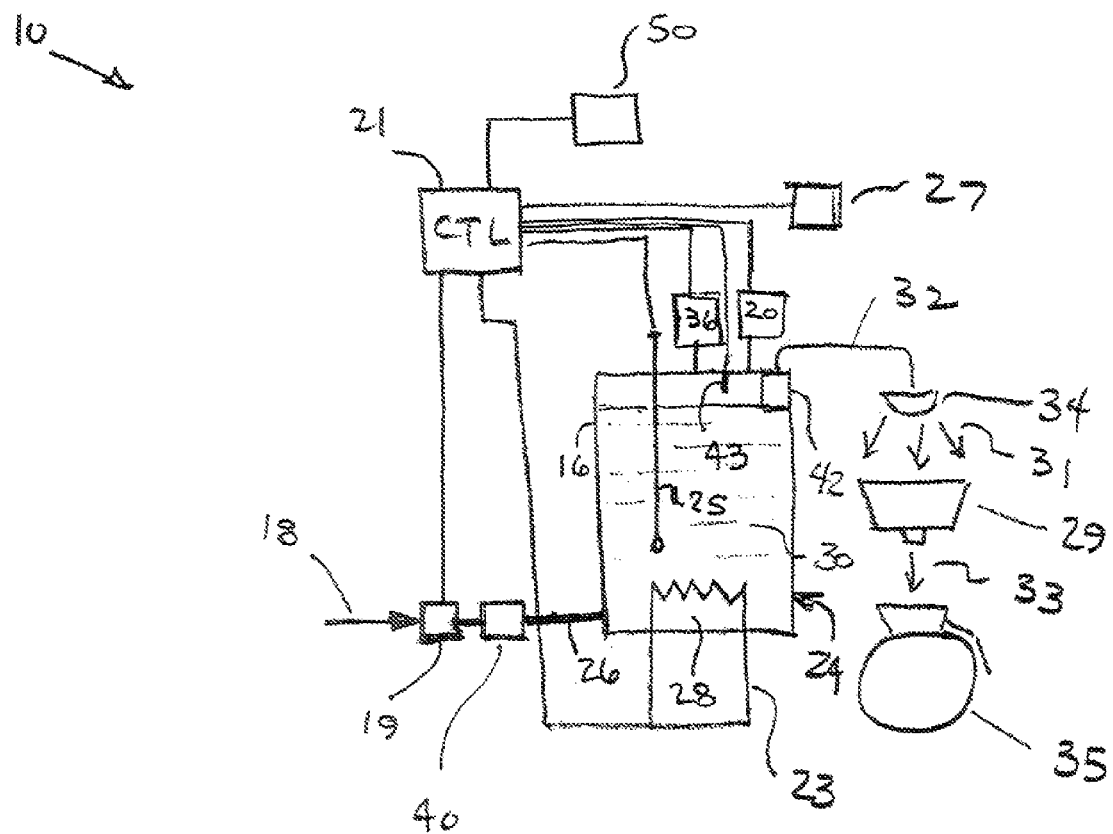
FIG. 2 is a diagrammatic illustration of an embodiment of the disclosed system and apparatus in which water is directly delivered to a heated water reservoir.

Water is introduced into unheated water reservoir 22 through a water inlet line 18 which is controllably operated by a controllable inlet valve 19. Alternatively, water may be introduced into the unheated reservoir 22 using a fill water basin as describe above, or water may be added directly to the reservoir by a user through an opening 300 having a lid or door 310 which is sealable 320. Alternatively water may be introduced directly to the heated water reservoir by a pressurized water line 18 as shown in FIG. 2.

A controller 21 is provided in the system. The controllable inlet valve 19 is coupled to and in communication with the controller 21. A heating device 23 is coupled to the controller 21 for controllably heating water 30 the heated water reservoir 24. A temperature sensor 25 is coupled to and communicates with the controller 21. Heating of the water in the reservoir 24 is controlled by the heating device 23 and the temperature sensor 25. A controller or interface 27 for allowing a customer to interface with and operate the system is coupled to and communicates with the controller 21. Also, a level sensor 43 may be provided in the reservoir for providing information to the controller 21 about the presence, absence or level of water in the reservoir. While a level sensor which generally detects the presence or absence of water it illustrated other versions of the level sensor may be used and all forms and variations as well as their equivalents are included in this disclosure without limitation.

In use, beverage brewing substance is placed in a beverage retainer or holder 29 such as a filter funnel assembly, for retaining the brewing substance during a brewing process. While a filter funnel assembly of a generally known construction is generally shown in the figures, the retainer 29 is to broadly interpreted to include a versions of holder that might be required or used to retain any form of beverage substance which could be used with the disclosed system. During the brewing process water 31 is dispensed form the heated water reservoir 24. The water is displaced from the heated water reservoir 24 as the result of water being displaced form the unheated water reservoir 22. Brewed beverage 33 is dispensed to a container 35 such as a beverage server or carafe.

Several benefits are associated with the pressurizing apparatus 20. The pressurizing device 20 is coupled to the controller 21 and a DC motor or other controllable device may be used to drive the pressurizing device to pressurize the unheated water reservoir results in a quieter operation. This is in contrast to the piston, peristaltic or gear pumps which may tend to have a more prominent pumping or pulsing sound. The disclosed system also allows for automatic start and stop during brewing. In this regard, a timer 50 can be attached or incorporated with the controller 21 to set a pre-determined brewing time. The system is generally lime tolerant because it eliminates surfaces, components and other structures which tend to accumulate lime in prior art brewing systems.

Another benefit of the present disclosure is that it allows for controllable and programmable brewing routines such as recipes to be used. Recipes can be programmed directly into the brewer or may be programmed into the brewer through a variety of brewing recipe devices such as the BrewWise® system produced by Bunn-O-Matic Corporation of Springfield, Ill., the disclosure of such BrewWise® systems and technology being incorporated herein by reference in its entirety. Additionally, the present system also provides for increased and more accurate brewing control such that the temperature and the flow rate can be more precisely controlled. In this regard, temperature sensors 25 in the heated water reservoir 24 can detect when a desired temperature level or range of temperature is achieved. In such a situation the brewer will not allow for a brewing cycle to start until a desired temperature is achieved.

With regard to FIG. 2, the structures and components are generally the same as that as shown in FIG. 1 and described herein. The difference between the embodiments in FIG. 2 and FIG. 1 are that the unheated reservoir 22 has been removed from FIG. 2. In FIG. 2 the inlet line 18 and inlet valve 19 are directly coupled to the inlet line 26. Additionally, the pressurizing system 20 communicates directly with the heated water reservoir 24 to provide pressurization of the heated water reservoir.

Figure 3:
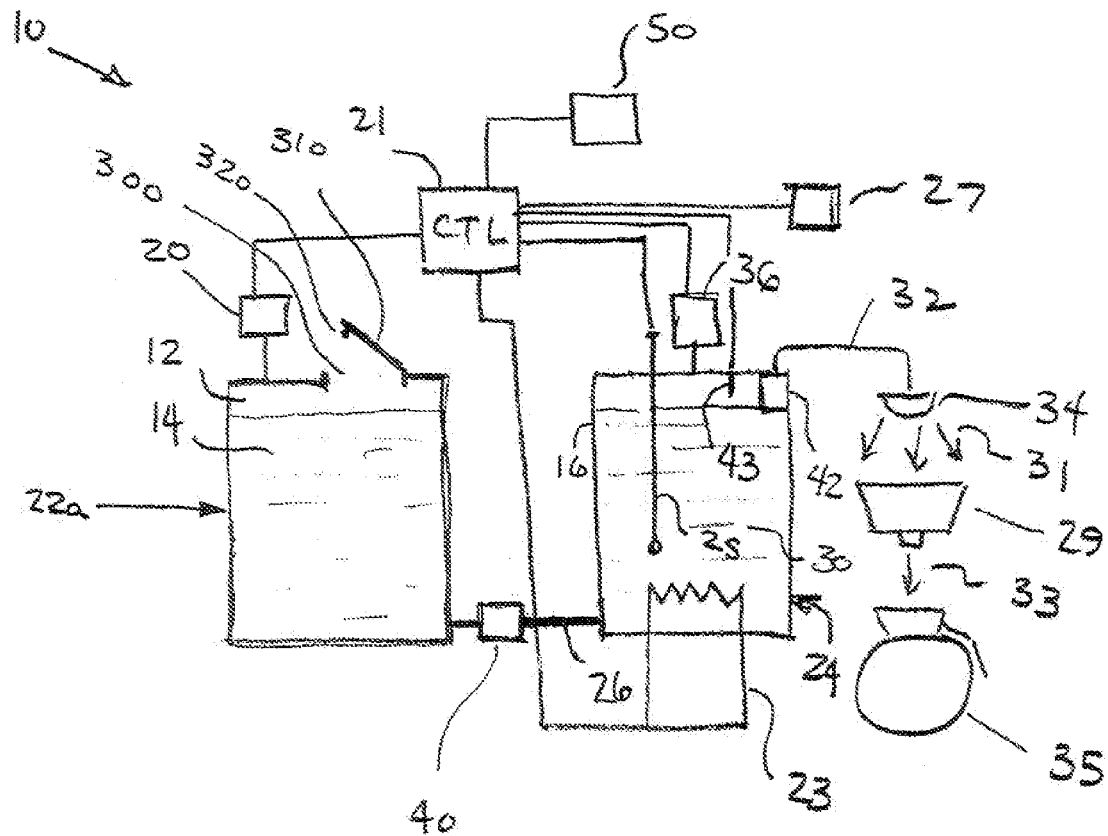
FIG. 3 is a diagrammatic illustration of the embodiment of the disclosed system and apparatus in which water is dispensed into an unheated water reservoir through an opening which is closed by a sealable lid.

The embodiment of FIG. 3 is similar to that as shown in FIG. 1, except for removal of the inlet line 18 and inlet control valve 19 and the addition of an openable reservoir 22a in FIG. 3. In the embodiment as shown in FIG. 3, the unheated water reservoir 22a includes an opening 300 and a lid 130 which is sealable over the opening with a seal 320. In the embodiment as shown in FIG. 3 the user opens the lid 310 and dispenses water into the unheated reservoir 22a. The lid 310 is sealed over the opening 300. Once the brewer is activated the pump 20 pressurizes the unheated reservoir to drive water from the unheated reservoir 22a through the passageway 26 to the heated water reservoir. Controlled operation of the pump 20 divides the movement of water 12 from the unheated reservoir 22a to the heated reservoir 24.

The various embodiments of the present disclosure provide numerous benefits with regard to the control of the beverage preparation device. By way of example but not limitation, the pressurized air system for moving water through the beverage preparation apparatus allows the apparatus to take on different configurations. In this regard, the spray head 34 can be positioned at any one of numerous positions or elevations relative to the server 35 because the pressurization of the heated water tank 24 is not dependant upon gravity nor is it dependent upon siphon flow. In other words, the overall configuration of the brewer 10 can be a lower profile to accommodate a variety of dimensional envelopes in which the brewer may be used.

With regard to the ability to position the spray head 34 at any one of numerous desired elevations or locations, the outlet line 32 may be in the form a flexible neck or other structure which could allow for adjustment of the spray head 34 to accommodate different size servers 35. For example, a goose neck structure could be used for the outline 32 to allow a user to raise or lower the spray head 34 and associated retainer 29 to accommodate a variety of server sizes 35.

As an additional matter, the pump 20 can be operated in any of the configurations to provide an air flow at the end of a brewing cycle. The air flow through the heated water reservoir 24 drives air through the outlet line 32 thereby reducing the amount of moisture in the outlet line 32 at the end of a beverage producing cycle. This also helps reduce the amount of mineral buildup in the outlet line 32. By way of example but not limitation, such a purging cycle would open the vent 36 at the end of a brew cycle thereby reducing the pressure in the heated water reservoir 24. With the vent 36 open, the pump 20 would be allowed to run for an additional period of time such that air will be moved through the outlet line 32.

As an additional matter with regard to lime prevention, the pulse or flow of air at the end of a brewing cycle will not only help to clear the outlet line 32 but will also help clear the cavity and openings in the spray head 34. In this regard, the spray head 34 generally defines an enclosed volume and has openings formed in a face thereof to allow the water which flows into the volume to be emitted therefrom and to be dispensed to the beverage retainer 29. Since the holes in the spray head 34 are generally of a small diameter, they may be prone to the accumulation of minerals deposits. The air flow at the end of a beverage cycle will help to also clear these openings thus reducing lime accumulation.

Additionally, the disclosed brewer eliminates a need for a dump valve or a spray head valve along the outlet line 32. This allows for the cleaning and removal of mineral or other deposits within the line 32. The ability to clean this line helps to eliminate the deposits which might otherwise have a negative impact on the flow and possibly flavor characteristics or other characteristics of the beverage 33. A form of deliming device such a spring, brush, rod may be inserted and easily remove mineral buildup.

Additionally, the disclosed system also allows different brewing flow rates to be applied to a brewing cycle. While it has been mentioned in this disclosure that a water pulsing routine or pulse brew feature may be used to control characteristics of the beverage, the flow rates may be controlled as well. Since the pump 20 may be in the form of a DC operated pump, the pump could be controlled to increase or decrease the flow rate in addition to starting and stopping the flow. Additionally, the pump 20 and vent 36 can be operated to start and stop the flow. The use of the controlled flow rate may allow for different control of the characteristics of the beverage.

With regard to FIG. 3, a level sensor 100 may also be added to the unheated water reservoir 22. The level sensor 100 in the unheated reservoir 22 allows the system to turn off the pump 22 when the reservoir is low or empty. In the embodiment as shown in FIG. 3 the user pours in the amount that they wish to use for the brewing cycle into the unheated water reservoir. When the level sensor 100 detects that the reservoir is low or empty it will signal the controller 21 that it is at end of cycle.

Additionally, the vent 36 can be couple to the controller 21 or may be in the form which is not coupled. Coupling the vent 36 to the controller 21 provides for additional control of the overall system. The vent valve 36 either in the controllable form or the uncontrolled form prevents expansion water which expands within the heated water reservoir 24 from the exiting the spray head during the heat up and brew cycles. This also allows water from being pushed out of the spray head when pouring water into the unheated reservoir.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. It is envisioned that those skilled in the art may devise various modifications and equivalents without departing from the spirit and scope of the disclosure as recited in the following combinations. Further, this application is intended to cover such departures from the present disclosure as come within the known or customary practice within the art to which it pertains.

The invention claimed is:

1. A beverage system for combining water with a beverage substance, the beverage system comprising:
   an unheated water reservoir, the unheated water reservoir having a water entry point sealable against pressurization of the interior of the reservoir to prevent reverse flow;
   a heated water reservoir communicating with the unheated water reservoir for passage of unheated water from the unheated water reservoir to the heated water reservoir;
   a beverage retainer for retaining a beverage making substance;
   a water outlet line coupled to the heated water reservoir and the beverage retainer;
   the water outlet line providing a path for delivering water from the heated water reservoir to the beverage retainer;
   a controller for controlling the beverage system;
   an air pressurizing apparatus communicating with the unheated water reservoir and coupled to the controller for controllably pressurizing the unheated water reservoir to controllably dispense water to the heated water reservoir.

2. The beverage system of claim 1, further comprising:
   a controllable water source coupled to the unheated water reservoir for delivering water to the unheated water reservoir.

3. The beverage system of claim 2, further comprising:
   the controllable water source is a pressurized water line with a controllable valve coupled to the controller.

4. The beverage system of claim 1, further comprising:
   the unheated water reservoir is selectively sealable to allow a user to dispense water therein and seal the reservoir for pressurizing.

5. A beverage system for combining water with a beverage substance, the beverage system comprising:
   an unheated water reservoir, the unheated water reservoir having a water entry point sealable against pressurization of the interior of the reservoir to prevent reverse flow;
   a heated water reservoir communicating with the unheated water reservoir for passage of unheated water from the unheated water reservoir to the heated water reservoir;
   a beverage retainer for retaining a beverage making substance;
   a water outlet line coupled to the heated water reservoir and the beverage retainer;
   the water outlet line providing a path for delivering water from the heated water reservoir to the beverage retainer;
   a controller for controlling the beverage system;
   a pressurizing apparatus communicating with the unheated water reservoir and coupled to the controller for controllably pressurizing the unheated water reservoir to controllably dispense water to the heated water reservoir; and
   a controllable water source coupled to the unheated water reservoir for delivering water to the unheated water reservoir.

6. The beverage system of claim 5, further comprising:
   the controllable water source is a pressurized water line with a controllable valve coupled to the controller.

7. The beverage system of claim 5, further comprising:
   the unheated water reservoir is selectively sealable to allow a user to dispense water therein and seal the reservoir for pressurizing.

8. The beverage system of claim 5, further comprising:
a heater operatively associated with the heated water reservoir and coupled to the controller for controllably heating the water in the heated water reservoir.

9. A method of making a beverage by combining water with a beverage substance, the method including the steps of:
retaining a volume of water in an unheated water reservoir;
providing a water entry in the unheated water reservoir;
retaining a beverage making substance in a beverage retainer;
providing a heated water reservoir communicating with the unheated water reservoir;
controllably delivering water to the unheated water reservoir through the water entry;
sealing the water entry of the unheated water reservoir against pressurization;
providing a water outlet line coupled to the heated water reservoir;
providing a controllable air pressurizing apparatus communicating with the unheated water reservoir; and
controllably pressurizing the unheated water reservoir to controllably dispense water from the unheated water reservoir to the heated water reservoir and through the water outlet line to the beverage retainer.

10. The method of making a beverage of claim 9 including the steps of:
controllably pulsing the controllable air pressurizing apparatus to control the flow of water to the beverage retainer.

11. The method of making a beverage by combining water with a beverage substance, the method including the steps of:
retaining a volume of water in an unheated water reservoir;
providing a water entry in the unheated water reservoir;
retaining a beverage making substance in a beverage retainer;
providing a heated water reservoir communicating with the unheated water reservoir;
controllably delivering water to the unheated water reservoir through the water entry;
sealing the water entry of the unheated water reservoir against pressurization;
providing a water outlet line coupled to the heated water reservoir;
providing a controllable pressurizing apparatus communicating with the unheated water reservoir;
controllably pressurizing the unheated water reservoir to controllably dispense water from the unheated water reservoir to the heated water reservoir and through the water outlet line to the beverage retainer; and
controllably pulsing the controllable pressurizing apparatus to control the flow of water to the beverage retainer.

12. The method of making a beverage of claim 11, further comprising:
controlling the flow rate of water to the beverage retainer to effect the characteristics of the beverage produced by the beverage making apparatus.

\* \* \* \* \*